United States Patent [19]
Anzai

[11] Patent Number: 6,041,085
[45] Date of Patent: Mar. 21, 2000

[54] CARRIER REGENERATING CIRCUIT, MULTI-LEVEL QUADRATURE AMPLITUDE DEMODULATOR, AND METHOD OF DETECTING FREQUENCY DEVIATION

[75] Inventor: Makoto Anzai, Tokyo, Japan

[73] Assignee: NEC Corporation, Tokyo, Japan

[21] Appl. No.: 08/963,620

[22] Filed: Nov. 4, 1997

[30] Foreign Application Priority Data

Nov. 22, 1996 [JP] Japan ..................... 8-312149

[51] Int. Cl.⁷ ............. H04L 27/14; H04L 27/06
[52] U.S. Cl. ............. 375/326; 375/344; 329/304
[58] Field of Search .................. 375/326, 327, 375/344, 261, 328; 455/182.2, 181.1, 192.1, 192.2; 331/12; 329/304, 308

[56] References Cited

U.S. PATENT DOCUMENTS

| | | | |
|---|---|---|---|
| 4,622,683 | 11/1986 | Basham et al. | 375/326 |
| 5,440,268 | 8/1995 | Taga et al. | 329/308 |
| 5,602,835 | 2/1997 | Seki et al. | 370/206 |
| 5,872,812 | 2/1999 | Saito et al. | 375/261 |
| 5,872,815 | 2/1999 | Strolle et al. | 375/321 |

FOREIGN PATENT DOCUMENTS

| | | |
|---|---|---|
| 0794634 | 9/1997 | European Pat. Off. ........ H04L 7/033 |
| 5-83320 | 4/1993 | Japan . |
| 5-91154 | 4/1993 | Japan . |
| 7-79270 | 3/1995 | Japan . |
| 7-87145 | 3/1995 | Japan . |
| 7-250118 | 9/1995 | Japan . |

*Primary Examiner*—Chi H. Pham
*Assistant Examiner*—Khai Tran
*Attorney, Agent, or Firm*—Foley & Lardner

[57] ABSTRACT

Level-holding circuits 16, 17 sample and hold the output of quadrature detecting circuit 11 at adjoining apertures of eye patterns of demodulated multi-level QAM signal components and at the middle point of the adjoining apertures, respectively. Thus, location information on a phase plane of demodulated signal such as (I0, Q0), (I1, Q1), and (I1/2, Q1/2) are obtained. Frequency deviation detecting circuit 18 calculates the amplitude and the direction of the frequency deviation of regenerated carrier based on the location information. The output of frequency deviation detecting circuit 18 is added to phase error signal in synthesizing circuit 20. The result of addition is applied to VCO 15.

17 Claims, 5 Drawing Sheets

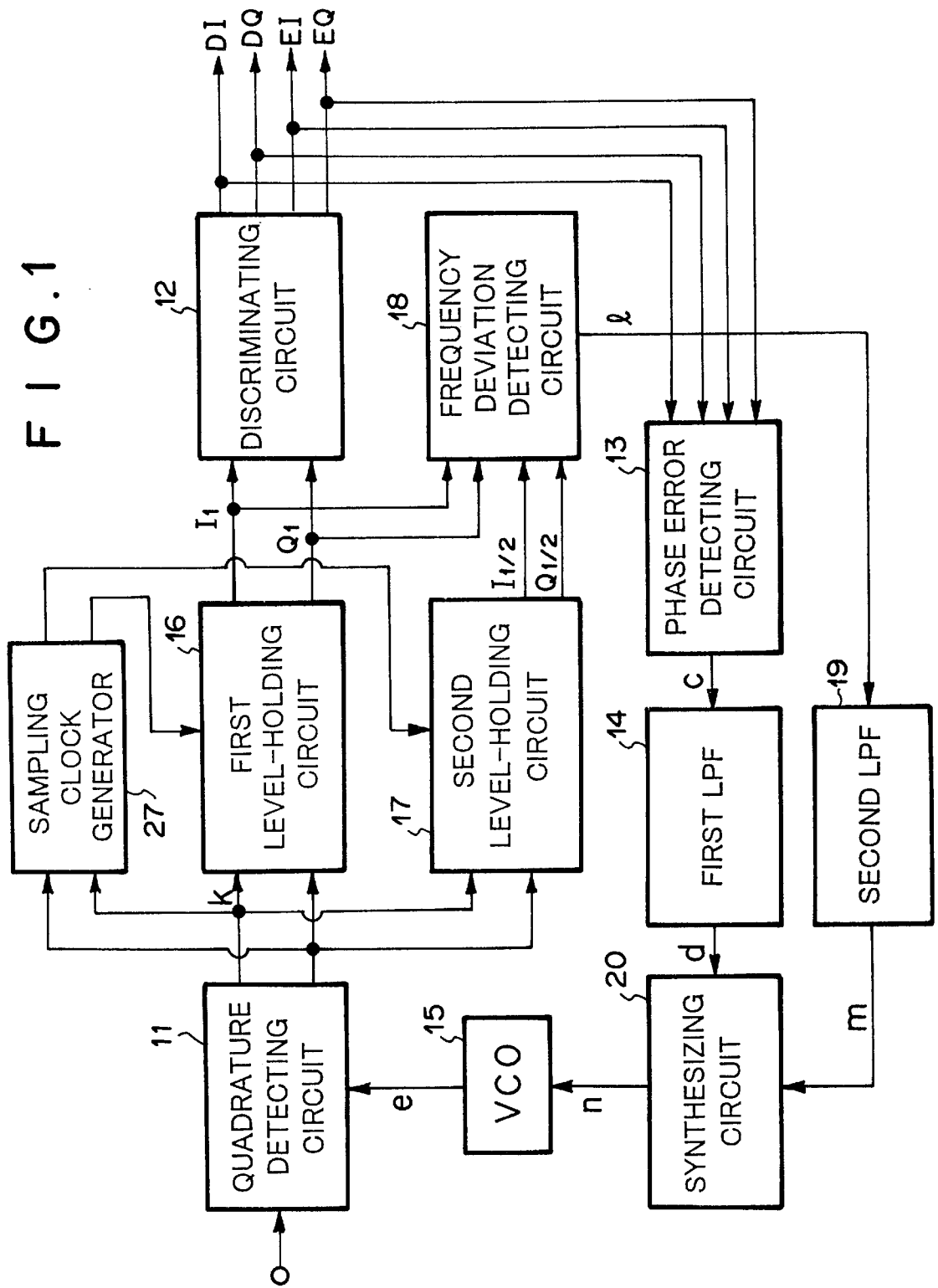

F I G. 3
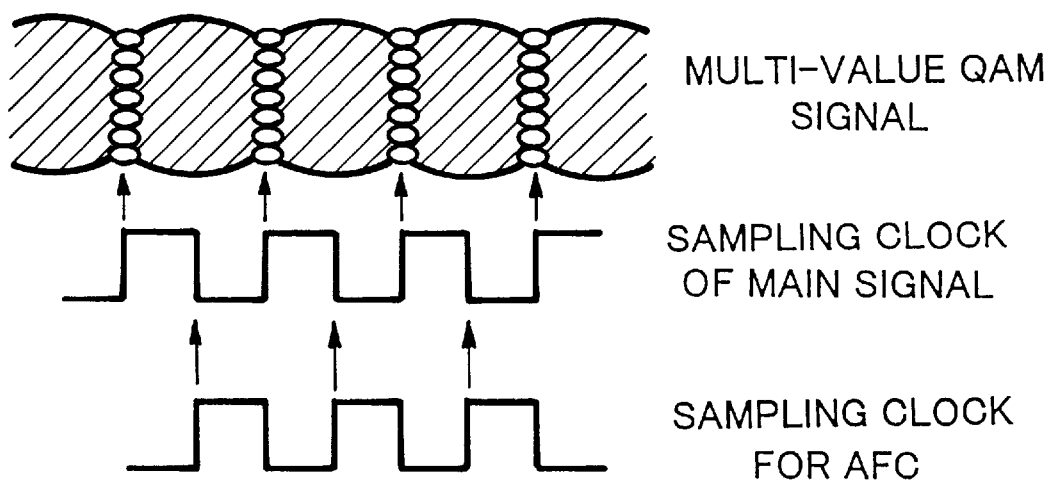
F I G. 4
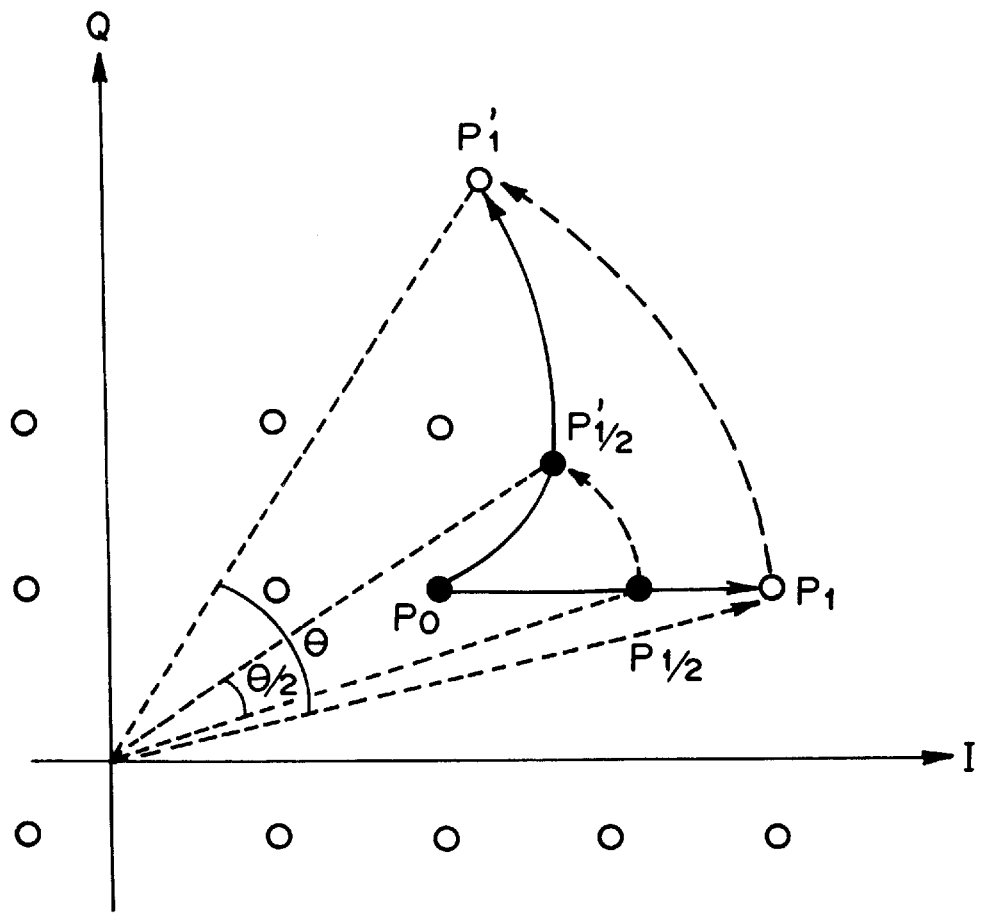

CARRIER REGENERATING CIRCUIT, MULTI-LEVEL QUADRATURE AMPLITUDE DEMODULATOR, AND METHOD OF DETECTING FREQUENCY DEVIATION

BACKGROUND OF THE INVENTION

1. Field of the Invention

The present invention relates to a carrier regenerating circuit having an automatic frequency controlling function which is used for multi-level quadrature amplitude demodulation.

2. Description of the Related Art

FIG. 6 shows the prior art reference 1. This is a carrier regenerating circuit having an frequency synchronizing function. The circuit shown in FIG. 6 is disclosed in Japanese Patent Application Laid-Open No. Hei-5-91154. The carrier regenerating circuit comprises quadrature phase detecting circuit 31, first multi-level discriminating circuit 32, phase error detecting circuit 33, first LPF (low pass filter) 34, VCO (voltage controlled oscillator) 35, second multi-level discriminating circuit 36, correlation calculating circuit 37, decision circuit 38, switch 39, second LPF 40, and synthesizing circuit 41.

Quadrature phase detecting circuit 31 is supplied with quadrature phase modulated signal 'a' from an input terminal and regenerated carrier 'e' supplied by VCO 35. Quadrature phase detecting circuit 31 generates baseband signal 'b' by synchronous detection of quadrature phase modulated signal 'a' using regenerated carrier 'e'. Two baseband signals 'b' are supplied to first multi-level discriminating circuit 32 and second multi-level discriminating circuit 36. The discriminating time of the first multi-level discriminating circuit 32 is set to discriminate the aperture of an eye pattern and the discriminating time of the second multi-level discriminating circuit 36 is set to discriminate the middle point between adjoining apertures. First discriminating circuit 32 outputs main demodulated signals DI, DQ and error signals EI, EQ. The outputs of discriminating circuit 32 are supplied to phase error detecting circuit 33, correlation calculating circuit 37, and decision circuit 38. Phase error detecting circuit 33 logically processes input signals to generate phase error signal 'c' which is used to control the oscillating phase of VCO 35. LPF 34 eliminates unnecessary components of phase error signal 'c' to generate main controlling signal 'd'.

Second multi-level discriminating circuit 36 discriminates the level of sampled signals and supplies the result of the discrimination to correlation calculating circuit 37 and decision circuit 38. Correlation calculating circuit 37 calculates the correlation between the outputs of first multi-level discriminating circuit 32 and the outputs of second multi-level discriminating circuit to generate a controlling signal for AFC (automatic frequency control) 'f'. Decision circuit 38 determines whether the two demodulated main signals of quadrature phase detecting circuit 31 simultaneously change and whether the level of the output of second multi-level discriminating circuit 36 exceeds a predetermined threshold based on the outputs of first multi-level discriminating circuit 32 and of second multi-level discriminating circuit 36, thereby outputting control signal 'g' for controlling switch 39. Switch 39 is closed when control signal 'g' is active. LPF 40 eliminates unnecessary components of controlling signal for AFC 'h'. The output of LPF 40 is added to main controlling signal 'd' in synthesizing circuit 41. The synthesized output signal of synthesizing circuit 41 is applied to VCO 35 where regenerated carrier 'e' is controlled by the synthesized output signal.

As the prior art reference 2, Japanese Patent Application Laid-Open No. Hei-7-250118 discloses a carrier regenerating circuit which is used by a demodulator in a digital signal transmission system adapting phase modulation such as BPSK (Binary Phase Shift Keying) and QPSK (Quadrature Phase Shift Keying). This carrier regenerating circuit features the wide carrier capture range and small scale. This carrier regenerating circuit forms a feedback loop which comprises a functional unit, a phase detecting circuit, a loop filter, a VCO and a ROM table. In this carrier regenerating circuit, the phase error output of the phase detecting circuit is processed in a square multiplier and LPF and then fed to a comparator. When this carrier regenerating circuit fall into pseudo synchronization, outputs of a delay circuit in the loop filter, of a delay circuit in the VCO, and of a delay circuit in the LPF are set to zero by the output of comparator. The loop filter comprises a limiter and outputs zero when input level exceeds limit level while it is in the second pseudo synchronizing state to proceed to the reset state.

As the prior art reference 3, Japanese Patent Application Laid-Open No. Hei-5-83320 discloses a carrier synchronizing circuit. This carrier synchronizing circuit is digitized and switches signal point to get phase information in the process of synchronization, thereby resulting in wide synchronizing capture range and short capture time. In this carrier synchronizing circuit, the phase error signal for controlling VCO, which regenerates carrier, is derived by manipulating logically the specific signal and error signal. The specific signal is one of demodulated signals which is generated from 16-value quadrature amplitude modulated signal. A logic circuit outputs a signal-point-detecting signal of negative logic only when 16-value quadrature amplitude modulated signal is at a specific signal point. The VCO outputs a carrier synchronization detecting signal of negative logic. In this carrier synchronizing circuit, the signal-point-detecting signal, the carrier synchronization detecting signal, and regenerated clock are logically manipulated and synchronized with a clock signal in a flip-flop so as to feedback the phase error signal only at specific a signal point to VCO before carrier synchronization has established. In the process of establishing carrier synchronization, error rate is monitored in a error rate finding circuit and the specific signal point, which the logic circuit detect, is altered to all signal points when error rate becomes less than predetermined value.

The prior art reference 1 has the disadvantages as follows.

The gain of frequency deviation detection decreases when the carrier regenerating circuit is applied to multi-level QAM (quadrature amplitude modulation) signal because it is designed for QPSK signal. Although the carrier regenerating circuit necessitates the signal locus which runs along a diagonal line on phase plane, such signal locus rarely arises in multi-level QAM signal because there are many signal points in multi-level QAM signal. Thus, it is difficult to apply the carrier regenerating circuit to multi-level QAM.

Further there is the disadvantage that the frequency judgement cannot be made before the phase synchronization has established. This is because the change of signal point from one to another along a diagonal line on phase plane cannot be detected if signal points are not in the proper position.

The prior art reference 2 also has similar disadvantages to the prior art reference 1 because it is designed for demodulating BPSK signal or QPSK signal.

Although the prior art reference 3 relates to the carrier synchronizing circuit for multi-level QAM signal, it has no AFC function and is different in structure from the present invention.

SUMMARY OF THE INVENTION

An object of the present invention is to provide a carrier regenerating circuit which effectively executes AFC for multi-level quadrature amplitude demodulation and continuously detects frequency deviation even when the phase synchronization has not established.

According to the present invention, there is provided a carrier regenerating circuit attached to a multi-level orthogonal amplitude demodulator, which comprises level-holding means which samples an d holds two demodulated signal components at adjoining apertures of eye patterns of the demodulated signal components to get location information (I0, Q0) and (I1, Q1) on phase plane of the demodulated signal and at the middle point of the adjoining aperture to get location information (I1/2, Q1/2) on phase plane of the demodulated signal, frequency deviation calculating means which calculates a semi frequency deviation signal based on deviation of current locus of the demodulated signal from the proper locus of the demodulated signal using the location information (I0, Q0), (I1/2, Q1/2), and (I1, Q1), and a voltage controlled oscillator which regenerates a carrier used by the multi-level orthogonal amplitude demodulator, wherein the voltage controlled oscillator is controlled by the semi frequency deviation signal, whereby the automatic frequency control of regenerated carrier can be performed.

In accordance with one aspect of the present invention, the frequency deviation calculating means calculates the semi frequency deviation signal S using the equation:

$$S = \frac{(I_1 + I_0) \times Q_{1/2} - (Q_1 + Q_0) \times I_{1/2}}{(I_0^2 + Q_0^2) - (I_1^2 + Q_1^2)}$$

In accordance with another aspect of the present invention, the frequency deviation calculating means calculates the semi frequency deviation signal S' using the equation:

$$S' = \{(I_0^2 + Q_0^2) - (I_1^2 + Q_1^2)\} \times \{(I_1 + I_0) \times Q_{1/2} - (Q_1 + Q_0) \times I_{1/2}\}$$

The carrier regenerating circuit further comprises arithmetic means which derives a frequency deviation signal based on the semi frequency deviation signal using the equation:

$$F = \sin^{-1}(S/K_{1/2}) \times 2/T/K_a$$

wherein S is a semi frequency deviation signal, K1/2 is the output value of overall filter of a transmission channel between a transmitter and a receiver at time T/2, T is a sample period, and Ka is modulation sensitivity of the voltage controlled oscillator which is controlled by the frequency deviation signal.

These and other objects, features and advantages of the present invention will become more apparent in light of the following detailed description of best mode embodiments thereof, as illustrated in the accompanying drawings.

BRIEF DESCRIPTION OF THE DRAWINGS

FIG. 1 is a block diagram showing an example of the structure of a multi-level quadrature amplitude demodulator including a carrier regenerating circuit according to the first and second embodiments of the present invention;

FIG. 3 is a diagrammatic view showing where one component of a multi-level QAM signal is sampled by a sampling clock of main signal and by a sampling clock for AFC;

FIG. 4 is a diagrammatic view showing the loci of multi-level QAM signal on a phase plane;

DESCRIPTION OF PREFERRED EMBODIMENTS

Next, with the reference to the accompanying drawings, embodiments of the present invention will be explained.

Figure 6:
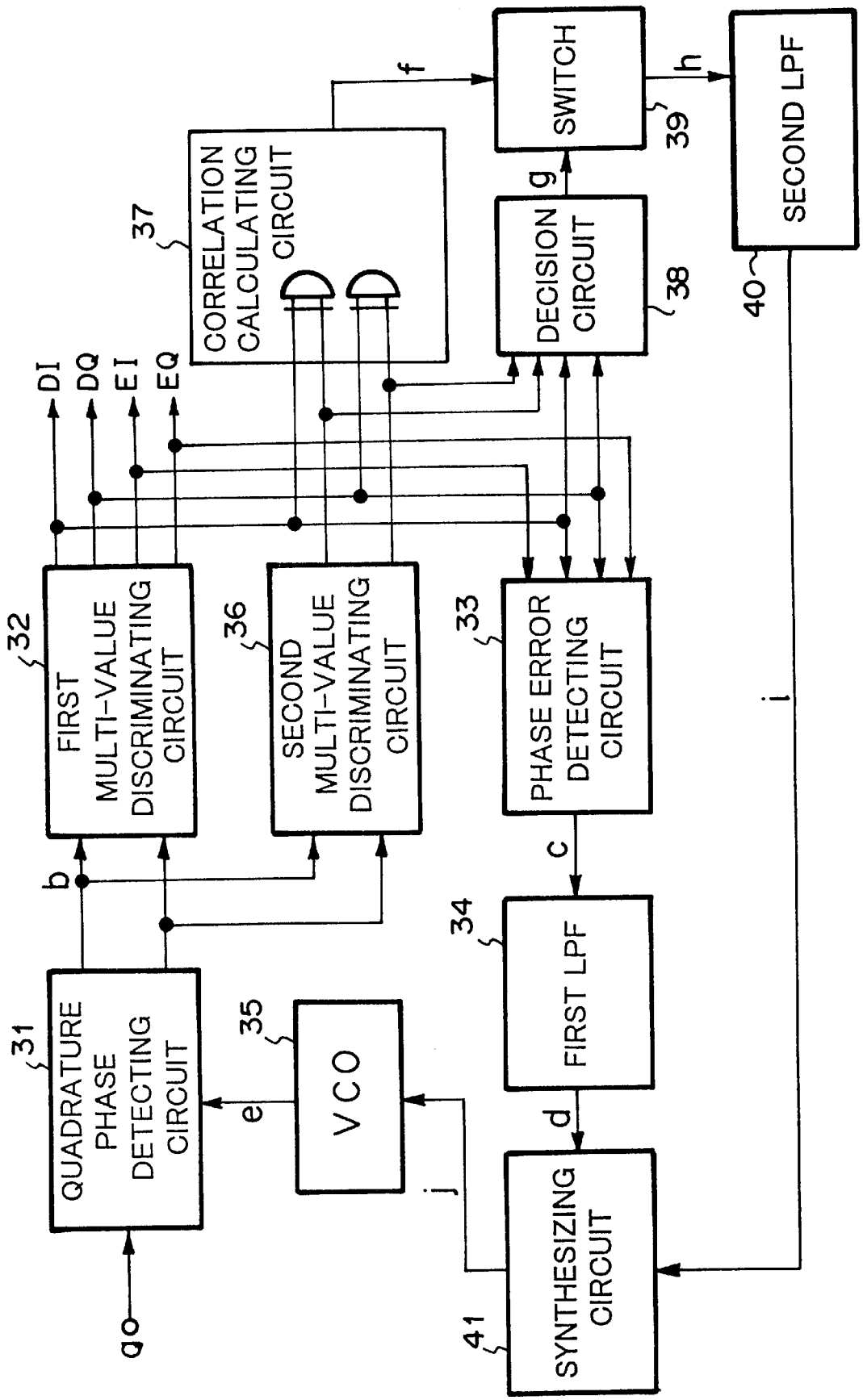
FIG. 6 is a block diagram showing an example of the structure of a QPSK demodulator including a carrier regenerating circuit according to the prior art.

FIG. 1 shows a multi-level quadrature amplitude demodulator including a carrier regenerating circuit according to the first embodiment of the present invention. The quadrature amplitude demodulator comprises quadrature detecting circuit 11, discriminating circuit 12, phase error detecting circuit 13, first LPF 14, VCO 15, first level-holding circuit 16, second level-holding circuit 17, frequency deviation detecting circuit 18, second LPF 19, synthesizing circuit 20, and sampling clock generator 27. Because phase error detecting circuit 13, first LPF 14, VCO 15, and synthesizing circuit 20 are the same as phase error detecting circuit 33, first LPF 34, VCO 35, and synthesizing circuit 41 of FIG. 6 in structure and operation respectively, the explanation of them is omitted.

Quadrature detecting circuit 11 demodulates a multi-level quadrature amplitude modulated signal by quadrature demodulation using regenerated carrier 'e'. First level-holding circuit 16 samples the two outputs of quadrature detecting circuit 11 at the aperture of eye pattern and holds them. Second level-holding circuit 17 samples the two outputs of quadrature detecting circuit 11 at the middle point between adjoining apertures and holds them. Sampling clocks of first level-holding circuit 16 and of second level-holding circuit 17 are generated in sampling clock generator 27 using the envelops of the two outputs of quadrature detecting circuit 11. Discriminating circuit 12 discriminates the outputs of first level-holding circuit 16 to generate main signals DI, DQ and error signals EI, EQ. The outputs of discriminating circuit 12 are supplied to phase error detecting circuit 13. Frequency deviation detecting circuit 18 detects frequency deviation based on the outputs of first level-holding circuit 16 and second level-holding circuit 17 and outputs the result of the detection. Second LPF 19 eliminates unnecessary components of the output of frequency deviation detecting circuit 18.

Figure 2A:
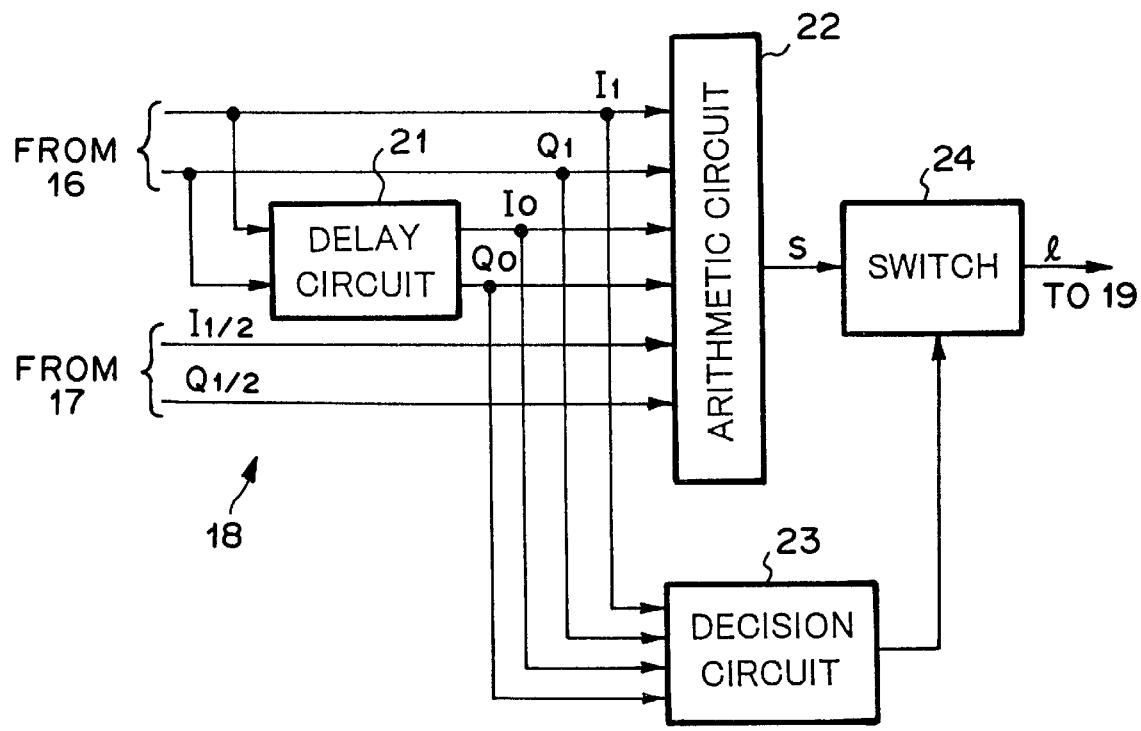
FIG. 2A is a block diagram showing an example of the structure of a frequency deviation detecting circuit according to the first embodiment of the present invention.

With the reference to FIG. 2A, first example of the structure of frequency deviation detecting circuit 18 shown in FIG. 1 will be explained. Frequency deviation detecting circuit 18 comprises delay circuit 21, arithmetic circuit 22, decision circuit 23, and switch 24. Delay circuit 21 delays current in-phase component I1 and current quadrature component Q1 fed by first level-holding circuit 16 by one sample period and supplies delayed in-phase component I0 and delayed quadrature component Q0 to arithmetic circuit 22. Arithmetic circuit 22 is also supplied with half-delayed in-phase component I1/2 and half-delayed quadrature component Q1/2 from second level-holding circuit 17. Arithmetic circuit 22 performs a calculation formulated by the following equation using delayed in-phase component I0, delayed quadrature component Q0, current in-phase component I1, current quadrature component Q1, half-delayed in-phase component I1/2 and half-delayed quadrature component Q1/2 at the interval of one sample.

$$S = \frac{(I_1 + I_0) \times Q_{1/2} - (Q_1 + Q_0) \times I_{1/2}}{(I_0^2 + Q_0^2) - (I_1^2 + Q_1^2)} \quad (1)$$

Decision circuit 23 performs a calculation formulated by the following equation using delayed in-phase component I0, delayed quadrature component Q0, current in-phase component I1, and current quadrature component Q1.

$$A = (I_0^2 + Q_0^2) - (I_1^2 + Q_1^2) \quad (2)$$

Decision circuit 23 judges whether or not the value of the result of the calculation A is equal to or more than predetermined level and outputs the result.

The connection of witch 24 is made when the result is affirmative.

With the reference to FIGS. 1 and 2, the operation of the carrier regenerating circuit according this embodiment of the present invention will be explained. Quadrature detecting circuit 11 is supplied with multi-level QAM signal and regenerated carrier 'e'. Regenerated carrier 'e' is supplied by VCO 15. Quadrature detecting circuit 11 demodulates multi-level QAM signal by synchronous detection using regenerated carrier 'e' to generate two baseband signals 'k'. Baseband signals 'k' are supplied to first level-holding circuit 16 and second level-holding circuit 17. The two level-holding circuits sample baseband signals 'k' at different time each other.

With the reference to FIG. 3, sample time of first level-holding circuit 16 and second level-holding circuit 17 will be explained. The upper part of FIG. 3 shows eye pattern of one of two components of multi-level QAM signal, the middle part of FIG. 3 shows sampling clock of main signal used in first level-holding circuit 16, and the lower part of FIG. 3 shows sampling clock for AFC used in second level-holding circuit 17. If sampling is performed with a clock of double speed, first level-holding circuit 16 and second level-holding circuit 17 can be merged into one level-holding circuit. Sampling clock of main signal is used to sample multi-level QAM signal at the aperture of eye pattern and sampling clock for AFC at the time delayed half period of the clocks or at the middle point between adjoining apertures of eye pattern.

The two outputs of first level-holding circuit 16, namely current in-phase component I1 and current quadrature component Q1, are supplied to discriminating circuit 12 and frequency deviation detecting circuit 18. The two outputs of second level-holding circuit 17, namely half-delayed in-phase component I1/2 and half-delayed quadrature component Q1/2, are supplied to frequency deviation detecting circuit 18. Discriminating circuit 12 discriminates current in-phase component I1 and current quadrature component Q1 to generate demodulated main signals DI, DQ and error signals EI, EQ and supplies the generated signals to output terminal and phase error detecting circuit 13. Phase error detecting circuit 13 generates and outputs phase error signal 'c' based on the four inputs. First LPF 14 eliminates unnecessary components of phase error signal 'c'. The output of first LFP 14 is synthesized in synthesizing circuit 20 with the output of second LPF 19 'm'. The output of synthesizing circuit 20, namely controlling signal 'n', is applied to VCO 15.

Before the explanation of the operation of frequency deviation detecting circuit 18, generally known 'demodulation locus' will be explained with the reference to FIG. 4. On the phase plane, which is also referred to as constellation diagram of phase points, shown in FIG. 4, some signal points, which is also referred to as phasor or complex vector, of multi-level QAM signal are located at intersecting points of a lattice. Signal points P0 and P1 are selected voluntarily for explanation. Signal point P0 at time 0 moves to signal point P1 at time T along the locus indicated in FIG. 4. Signal point at time T/2 is represented by P1/2. The relation among P0, P2, and P1/2 formulated by the following equation is kept if the influence of preceding signal points and succeeding signal points is ignored:

$$P_{1/2} = K_{1/2}(P_0 + P_1) \quad (3)$$

where K1/2 is the output value of the overall filter of a transmission channel between a transmitter and a receiver at time T/2.

Signal points and locus in the case that the frequency of regenerated carrier deviates from the frequency of received multi-level QAM signal by fd will be explained. In this case, the signal starting from point P0 at time 0 moves to point P1' at time T. Point P1' corresponds to point P1 rotated by angle θ around the axis of a phase plane. The relation between angle θ and frequency deviation fd is expressed as the following equation:

$$\theta = f_d \times T \quad (4)$$

Similarly, Signal point at time T/2 rotates from P1/2 to point P'1/2. The relation between point P1 and P1' and between point P1/2 and P'1/2 are expressed as the following equations:

$$P_1' = R(\theta)P_1 \quad (5)$$

$$P_{1/2}' = R(\theta)P_{1/2} \quad (6)$$

where R(θ) is rotation matrix when rotation angle is θ. These two equations have other forms expressed as follows:

$$P_1 = R(-\theta)P_1' \quad (7)$$

$$P_{1/2} = R(-\theta)P_{1/2}' \quad (8)$$

Substituting equation (7) and (8) to equation (3), the following equation is derived:

$$R(-\theta/2)P_{1/2}' = K_{1/2}(P_0 + R(-\theta)P_1') \quad (9)$$

By changing the form of equation (9) with the use of formula of rotation matrix, the following equation is obtained:

$$P_{1/2}' = K_{1/2}(R(\theta/2)P_0 + R(-\theta/2)P_1') \quad (10)$$

Supposing P0=(i0, q0), P1'=(i1, q1), P1/2'=(i1/2, q1/2), equation (10) is transformed to the following equation:

$$\begin{bmatrix} i_{1/2} \\ q_{1/2} \end{bmatrix} = K_{1/2} \begin{bmatrix} \cos(\theta/2) & -\sin(\theta/2) \\ \sin(\theta/2) & \cos(\theta/2) \end{bmatrix} \begin{bmatrix} i_0 \\ q_0 \end{bmatrix} + K_{1/2} \begin{bmatrix} \cos(-\theta/2) & -\sin(-\theta/2) \\ \sin(-\theta/2) & \cos(-\theta/2) \end{bmatrix} \begin{bmatrix} i_1 \\ q_1 \end{bmatrix} \quad (11)$$

By changing the form of the equation (11), the following equation is obtained:

$$\begin{bmatrix} i_{1/2} \\ q_{1/2} \end{bmatrix} = K_{1/2} \begin{bmatrix} i_0 + i_1 & -q_0 + q_1 \\ q_0 + q_1 & i_0 - i_1 \end{bmatrix} \begin{bmatrix} \cos(\theta/2) \\ \sin(\theta/2) \end{bmatrix} \quad (12)$$

By applying transpositon to equation (12), the following equation is obtained:

$$\begin{bmatrix} \cos(\theta/2) \\ \sin(\theta/2) \end{bmatrix} = \quad (13)$$

$$\frac{1}{K_{1/2}} \times \frac{1}{(i_0^2 + q_0^2) - (i_1^2 + q_1^2)} \times \begin{bmatrix} i_0 - i_1 & q_0 - q_1 \\ -q_0 - q_1 & i_0 + i_1 \end{bmatrix} \begin{bmatrix} i_{1/2} \\ q_{1/2} \end{bmatrix}$$

wherein $(i_0^2 + q_0^2) - (i_1^2 + q_1^2) \neq 0$

Because the sign of $\sin(\theta/2)$ is equal to rotation angle $\theta$ in the range of rotation angle $\theta$ from $-2\pi$ to $+2\pi$ and rotation angle $\theta$ is proportional to frequency deviation fd, the direction of frequency deviation fd can be derived from the sign of $\sin(\theta/2)$ By taking a part of equation (13), $\sin(\theta/2)$ is formulated by the following equation:

$$\sin(\theta/2) = \frac{1}{K_{1/2}} \times \frac{(i_0 + i_1) \cdot q_{1/2} - (q_0 + q_1) \cdot i_{1/2}}{(i_0^2 + q_0^2) - (i_1^2 + q_1^2)} \quad (14)$$

Although points P0 and P1 have been assumed to be at the signal points of multi-level QAM up to now, equations (4) through (14) are kept for any point on a phase plane provided equation (3) is established. That is, even when phase synchronization has not been established and points P0 and P1 are not at the signal points of multi-level QAM, equations (3) through (14) are maintained.

It is obvious that the outputs of first level-holding circuit 16, namely current in-phase component I1 and current quadrature component Q1, correspond to i1 and q1 in equations (11) through (14), respectively, and the outputs of second level-holding circuit 17, namely half-delayed in-phase component I1/2 and half-delayed quadrature component Q1/2, correspond to i1/2 and q1/2 in equations (11) through (14), respectively.

With the reference to FIG. 2A, the operation of frequency deviation detecting circuit 18 will be explained. Current in-phase component I1 and current quadrature component Q1 are supplied to arithmetic circuit 22 and decision circuit 23. Delay circuit 21 delays current in-phase component I1 and current quadrature component Q1 by one clock period to generate delayed in-phase component I0 and delayed quadrature component Q0 and supplies the delayed components to arithmetic circuit 22. Delayed in-phase component I0 and delayed quadrature component Q0 correspond to i0 and q0, respectively. Half-delayed in-phase component I1/2 and half-delayed quadrature component Q1/2 are supplied to arithmetic circuit 22. Arithmetic circuit 22 executes the calculation as formulated by equation (1). Comparing equation (1) and (14), it is observed that S is K1/2 times as large as $\sin(\theta/2)$. If frequency deviation fd is negative, S is also negative and if frequency deviation fd is positive, S is also positive because K1/2 is a positive number. Also, if frequency deviation fd is zero, S is zero.

Because S is arbitrary if A in equation (2) is zero, decision circuit 23 judges whether or not A is less than predetermined level and breaks the connection of switch 24 in affirmative case.

As mentioned above, frequency deviation detecting circuit 18 outputs AFC controlling signal '1' having the information of frequency deviation. Unnecessary component of AFC controlling signal '1' is eliminated in second LPF 19 to generate AFC controlling signal 'm', which is added to main controlling signal 'd' in synthesizing circuit 20. Therefore, the frequency of regenerated carrier 'e' is corrected dominantly by AFC controlling signal '1' when it deviates from correct frequency, and once the frequency deviation disappears, AFC controlling signal '1' becomes zero and phase error signal 'c' becomes dominant, whereby phase synchronization is established.

Next, a multi-level quadrature amplitude demodulator comprising a carrier regenerating circuit according to second embodiment of the present invention will be explained. Whole structure of the demodulator and the carrier regenerating circuit according to second embodiment are the same as those according to first embodiment. The difference between them is only the structure of frequency deviation detecting circuit. Thus, frequency deviation detecting circuit according to second embodiment is represented by 18A.

Figure 2B:
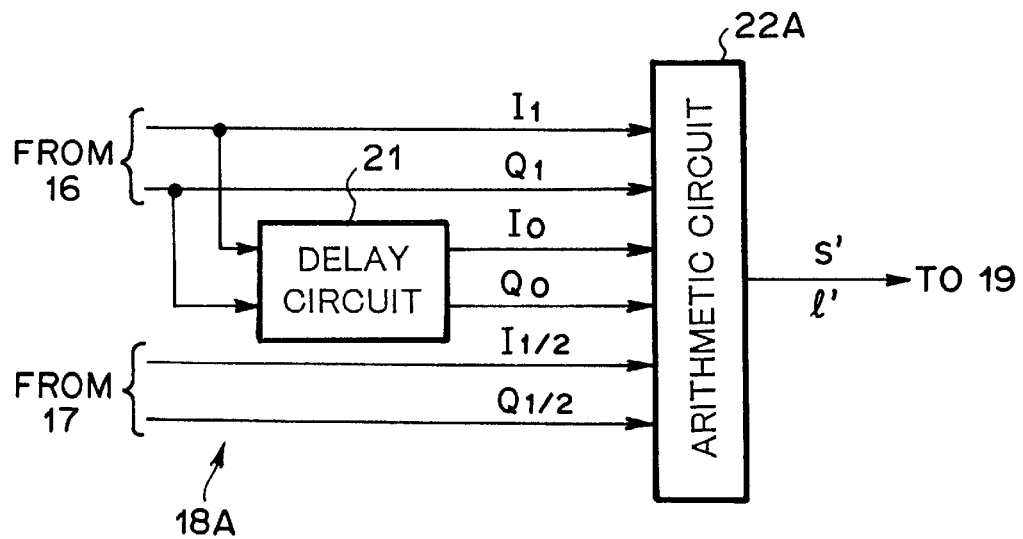
FIG. 2B is a block diagram showing an example of the structure of a frequency deviation detecting circuit according to the second embodiment of the present invention.

FIG. 2B shows the structure of frequency deviation detecting circuit 18A. Arithmetic circuit 22A is provided with delayed in-phase component I0, delayed quadrature component Q0, current in-phase component I1, current quadrature component Q1, half delayed in-phase component I1/2, and half delayed quadrature component Q1/2. Arithmetic circuit 22A performs calculation formulated by the following equation instead of equation (1).

$$S' = \{(I_0^2 + Q_0^2) - (I_1^2 + Q_1^2)\} \times \{(I_1 + I_0) \times Q_{1/2} - (Q_1 + Q_0) \times I_{1/2}\} \quad (15)$$

The polarity of S' is the same as that of S. On the contrary to that S is arbitrary in the condition:

$\{(I_0^2 + Q_0^2) - (I_1^2 + Q_1^2)\} = 0$

S' is zero in this condition. Thus, this condition does not have a bad influence upon frequency deviation detection. Thus, the same circuits as decision circuit 23 and switch 24 are not necessary, thereby resulting in the simple structure of frequency deviation detecting circuit 18A.

Figure 5:
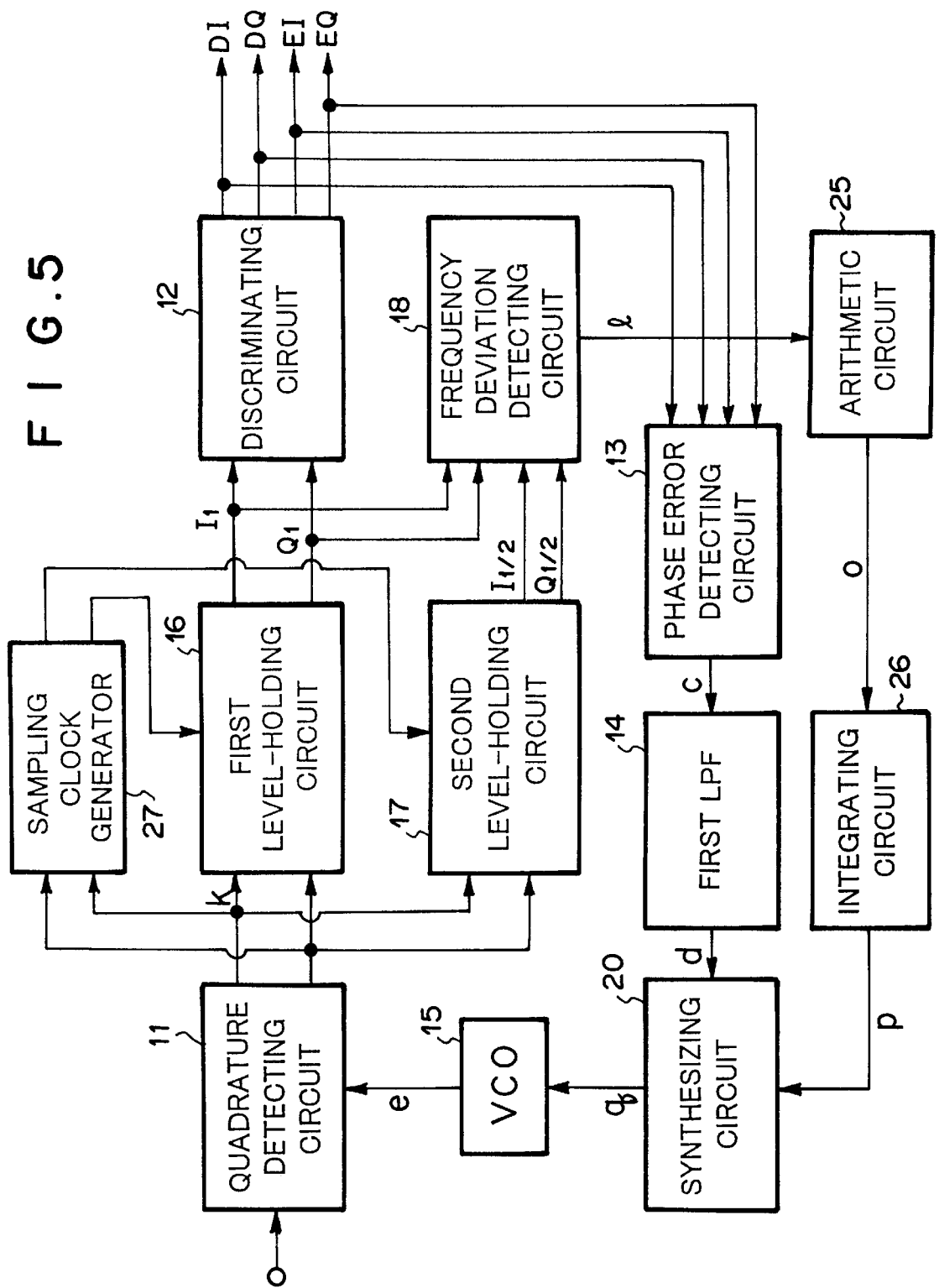
FIG. 5 is a block diagram showing an example of the structure of a multi-level quadrature amplitude demodulator including a carrier regenerating circuit according to third embodiment of the present invention.

Next, with the reference to FIG. 5, a multi-level quadrature amplitude demodulator comprising a carrier regenerating circuit according to third embodiment of the present invention will be explained. The structure of the multi-level quadrature amplitude demodulator comprising the carrier regenerating circuit according to third embodiment is the same as those according to first and second embodiments except that second LPF 19 is replaced by arithmetic circuit 25 and integrating circuit 26. The output of frequency deviation detecting circuit 18 or 18A is supplied to arithmetic circuit 25. The output of arithmetic circuit 25 is supplied to integrating circuit 26, of which output is supplied to synthesizing circuit 20. Arithmetic circuit 25 performs calculation formulated by the following equation:

$$F = \sin^{-1}(S/K_{1/2}) \times 2/T/K_a \quad (16)$$

In equation (16), Ka is modulation sensitivity of VCO 15, that is the ration of the change of oscillation frequency to the change of controlling voltage 'q'. It is understood from equation (4) and (14) that F is equal to controlling voltage of VCO 15 required to correct frequency deviation fd in the range of $\theta$ expressed as $-\pi < \theta < \pi$.

According to third embodiment, after adding the voltage of integrated signal 'p' of the output of arithmetic circuit 25 to main controlling voltage 'd' in synthesizing circuit 20, correction of main controlling voltage 'd' immediately finishes, whereby pull-in time is drastically shortened.

Moreover, according to third embodiment, pull-in time is shortened. This is because the amount of frequency deviation is detected and used for correcting frequency deviation as well as the direction of frequency deviation is.

According to the present invention, it is possible to derive the information about frequency deviation effectively. This is because the information about frequency deviation can be derived from every locus from one symbol to another symbol adjoining each other except in the case the amplitudes of the two adjoining symbols on a phase plane are the same.

In addition, according to the present invention, it is possible to derive the information about frequency deviation even before phase synchronization has established. This is because the information about frequency deviation can be derived regardless of the phase of regenerated carrier as long as timing of signal points used for frequency detection is correct.

Although the present invention has been shown and described with respect to best mode embodiments thereof, it should be understood by those skilled in the art that foregoing and various other changes, omissions, and additions in the form and detail thereof may be made therein without departing from the spirit and scope of the present invention.

What is claimed is:

1. A carrier regenerating circuit attached to a multi-level orthogonal amplitude demodulator, which comprises level-holding means which samples and holds two demodulated signal components at adjoining apertures of eye patterns of said two demodulated signal components to get location information (I0, Q0) and (I1, Q1) on a phase plane of said two demodulated signal components and at a middle point of said adjoining aperture to get additional location information (I1/2, Q1/2) on said phase plane of said two demodulated signal components, frequency deviation calculating means which calculates a semi frequency deviation signal based on deviation of a current locus of said two demodulated signal components from a proper locus of said two demodulated signal components using said location and additional location information (I0, Q0), (I1/2, Q1/2), and (I1, Q1), and a voltage controlled oscillator which regenerates a carrier used by said multi-level orthogonal amplitude demodulator, wherein said voltage controlled oscillator is controlled by said semi frequency deviation signal, wherein automatic frequency control of regenerated carrier is performed.

2. The carrier regenerating circuit according to claim 1, wherein said frequency deviation calculating means calculates said semi frequency deviation signal S using the equation:

$$S = \frac{(I_1 + I_0) \times Q_{1/2} - (Q_1 + Q_0) \times I_{1/2}}{(I_0^2 + Q_0^2) - (I_1^2 + Q_1^2)}.$$

3. The carrier regenerating circuit according to claim 1, wherein said frequency deviation calculating means calculates said semi frequency deviation signal S' using the equation:

$$S' = \{(I_0^2+Q_0^2)-(I_1^2+Q_1^2)\} \times \{(I_1+I_0) \times Q_{1/2}-(Q_1+Q_0) \times I_{1/2}\}.$$

4. The carrier regenerating circuit according to claim 1, which further comprises arithmetic means which derives a frequency deviation signal based on said semi frequency deviation signal using the equation:

$$F = \sin^{-1}(S/K_{1/2}) \times 2/T/K_a$$

wherein S is semi frequency deviation signal, K1/2 is an output value of an overall filter of a transmission channel between a transmitter and a receiver at time T/2, T is a sample period, and Ka is a modulation sensitivity of said voltage controlled oscillator which is controlled by said frequency deviation signal.

5. The carrier regenerating circuit according to claim 1, which further comprises a low pass filter which eliminates unnecessary components from said semi frequency deviation signal.

6. The carrier regenerating circuit according to claim 4, which further comprises integrating means which integrates said frequency deviation signal.

7. A method of detecting frequency deviation used for a carrier regenerating circuit having automatic frequency control function which is attached to a multi-level orthogonal amplitude demodulator, which comprises the steps of:

sampling and holding two demodulated signal components at adjoining apertures of eye patterns of said demodulated signal components to get location information (I0, Q0) and (I1, Q1) on a phase plane of said two demodulated signal components and at a middle point of said adjoining aperture to get additional location information (I1/2, Q1/2) on said phase plane of said two demodulated signal components, and calculating a semi frequency deviation signal based on deviation of a current locus of said two demodulated signal components from a proper locus of said two demodulated signal components using said location and additional location information (I0, Q0), (I1/2, Q1/2), and (I1, Q1), regenerating a carrier used by said multi-level orthogonal amplitude demodulator based on said semi frequency deviation signal whereby said automatic frequency control of regenerated carrier is performed.

8. The method of detecting frequency deviation according to claim 7, wherein said step of calculating said semi frequency deviation signal S uses the equation:

$$S = \frac{(I_1 + I_0) \times Q_{1/2} - (Q_1 + Q_0) \times I_{1/2}}{(I_0^2 + Q_0^2) - (I_1^2 + Q_1^2)}.$$

9. The method of calculating frequency deviation according to claim 7, wherein said step of calculating said semi frequency deviation signal S' uses the equation:

$$S' = \{(I_0^2+Q_0^2)-(I_1^2+Q_1^2)\} \times \{(I_1+I_0) \times Q_{1/2}-(Q_1+Q_0) \times I_{1/2}\}.$$

10. The method of detecting frequency deviation according to claim 7, which further comprises a step of deriving a frequency deviation signal based on said semi frequency deviation signal using the equation:

$$F = \sin^{-1}(S/K_{1/2}) \times 2/T/K_a$$

wherein S is said semi frequency deviation signal, K1/2 is an output value of an overall filter of a transmission channel between a transmitter and a receiver at time T/2, T is a sample period, and Ka is a modulation sensitivity of a voltage controlled oscillator.

11. A multi-level quadrature amplitude demodulator, which comprises:

quadrature detecting means which demodulates a multi-level quadrature amplitude modulated signal using a regenerated carrier to generate an in-phase component and a quadrature component, first level-holding means which samples and holds said in-phase component and said quadrature component at an aperture of eye patterns of said in-phase component and said quadrature component to generate and output a current in-phase component and a current quadrature component, second level-holding means which samples and holds said in-phase component and said quadrature component at a middle point of said aperture to generate and output a half-delayed in-phase component and a half-delayed quadrature component, sampling clock generating means which generates sampling clocks of said first level-holding means and said second level-holding means, discriminating means which discriminates said current in-phase component and said quadrature component to generate two main signals and two error signals, frequency deviation calculating means which calculates a semi frequency deviation signal based on said current in-phase component, said current quadrature component, said half-delayed in-phase component, and said half-delayed quadrature component, phase error calculating means which calculates a phase error signal by logically processing said two main signals and said two error signals, synthesizing means which synthesizes said semi frequency deviation signal and said phase error signal to generates control voltage, and a voltage controlled oscillator which outputs said regenerated carrier having a frequency which is controlled by said control voltage.

12. The multi-level quadrature amplitude demodulator according to claim 11, wherein said frequency deviation calculating means calculates said semi frequency deviation signal using the equation:

$$S = \frac{(I_1 + I_0) \times Q_{1/2} - (Q_1 + Q_0) \times I_{1/2}}{(I_0^2 + Q_0^2) - (I_1^2 + Q_1^2)}$$

wherein $I_0$ is a delayed in-phase component which is delayed from said current in-phase component by one sample period, $Q_0$ is a delayed quadrature component which is delayed from said current quadrature component by one sample period, $I_{1/2}$ is said half-delayed in-phase component, $Q_{1/2}$ is said half-delayed quadrature component, $I_1$ is said current in-phase component, and $Q_1$ is said current quadrature component.

13. The multi-level quadrature amplitude demodulator according to claim 11, wherein said frequency deviation calculating means calculates said semi frequency deviation signal using the equation:

$$S' = \{(I_0^2+Q_0^2)-(I_1^2+Q_1^2)\} \times \{(I_1+I_0) \times Q_{1/2}-(Q_1+Q_0) \times I_{1/2}\}$$

wherein $I_0$ is a delayed in-phase component which is delayed from said current in-phase component by one sample period, $Q_0$ is a delayed quadrature component which is delayed from said current quadrature component by one sample period, $I_{1/2}$ is said half-delayed in-phase component, $Q_{1/2}$ is said half-delayed quadrature component, $I_1$ is said current in-phase component, and $Q_1$ is said current quadrature component.

14. The multi-level quadrature amplitude demodulator according to claim 11, which further comprises arithmetic means which derives frequency deviation signal based on said semi frequency deviation signal using the equation:

$$F = \sin^{-1}(S/K_{1/2}) \times 2/T/K_a$$

wherein S is said semi frequency deviation signal, $K_{1/2}$ is the output value of overall filter of a transmission channel between a transmitter and a receiver at time T/2, T is a sample period, and Ka is modulation sensitivity of said voltage controlled oscillator.

15. The multi-level quadrature amplitude demodulator according to claim 11, which further comprises a low pass filter which eliminates unnecessary components of said phase error signal.

16. The multi-level quadrature amplitude demodulator according to claim 11, which further comprises a low pass filter which eliminates unnecessary components of said semi frequency deviation signal.

17. The multi-level quadrature amplitude demodulator according to claim 14, which further comprises integrating means which integrates said frequency deviation signal.

* * * * *